United States Patent
Lee et al.

(10) Patent No.: US 10,171,543 B2
(45) Date of Patent: Jan. 1, 2019

(54) MEDIA STREAMING METHOD AND ELECTRONIC DEVICE THEREOF

(71) Applicant: Samsung Electronics Co., Ltd., Suwon-si, Gyeonggi-do (KR)

(72) Inventors: Heung-Ki Lee, Suwon-si (KR); Kyung-Jin Ahn, Seongnam-si (KR); Ji-Yoon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/680,600

(22) Filed: Apr. 7, 2015

(65) Prior Publication Data
US 2015/0288737 A1    Oct. 8, 2015

(30) Foreign Application Priority Data

Apr. 7, 2014 (KR) .................. 10-2014-0041171

(51) Int. Cl.
*G06F 15/16* (2006.01)
*H04L 29/06* (2006.01)

(52) U.S. Cl.
CPC ........ *H04L 65/608* (2013.01); *H04L 65/4092* (2013.01); *H04L 65/80* (2013.01)

(58) Field of Classification Search
CPC ............. H04L 29/06027; H04L 65/607; H04L 12/5601; H04L 65/608; H04N 21/23406; H04N 21/4305; H04N 21/4307; H04N 21/6437
See application file for complete search history.

(56) References Cited

U.S. PATENT DOCUMENTS

| | | | |
|---|---|---|---|
| 7,668,170 B2* | 2/2010 | Deshpande | H04L 47/564 370/394 |
| 2002/0110149 A1* | 8/2002 | Roberts | H04L 29/06 370/477 |
| 2003/0076784 A1* | 4/2003 | Ta | H04L 43/00 370/250 |
| 2004/0049793 A1 | 3/2004 | Chou | |
| 2008/0019398 A1* | 1/2008 | Genossar | H04J 3/0632 370/498 |
| 2008/0144519 A1* | 6/2008 | Cooppan | H04L 43/0817 370/252 |
| 2008/0298692 A1* | 12/2008 | Guo | H04N 19/61 382/232 |
| 2008/0310316 A1* | 12/2008 | Oran | H04L 43/00 370/252 |
| 2010/0074535 A1* | 3/2010 | Bennett | H04N 19/172 382/209 |
| 2010/0205318 A1 | 8/2010 | Melnyk et al. | |
| 2010/0303146 A1* | 12/2010 | Kamay | H04N 21/2343 375/240.02 |
| 2010/0306413 A1* | 12/2010 | Kamay | H04N 19/503 709/247 |

(Continued)

*Primary Examiner* — Ninos Donabed
(74) *Attorney, Agent, or Firm* — Jefferson IP Law, LLP

(57) ABSTRACT

A method of operating a first electronic device is provided. The method includes transmitting stream data to a second electronic device, receiving, from the second electronic device, stream information associated with the stream data received by the second electronic device, and determining at least some of the stream data to be transmitted to the second electronic device based on the received stream information.

17 Claims, 9 Drawing Sheets

(56) References Cited

U.S. PATENT DOCUMENTS

| | | | |
|---|---|---|---|
| 2012/0051436 A1* | 3/2012 | Chen | H04N 21/23406 375/240.25 |
| 2012/0233346 A1* | 9/2012 | Sang | H04L 65/80 709/231 |
| 2014/0071802 A1* | 3/2014 | Klimin | H04L 47/36 370/216 |
| 2014/0201383 A1* | 7/2014 | Kuehnel | H04W 88/06 709/231 |
| 2014/0269942 A1* | 9/2014 | Mikov | H04N 19/172 375/240.27 |

* cited by examiner

MEDIA STREAMING METHOD AND ELECTRONIC DEVICE THEREOF

CROSS-REFERENCE TO RELATED APPLICATION(S)

This application claims the benefit under 35 U.S.C. § 119(a) of a Korean patent application filed on Apr. 7, 2014 in the Korean Intellectual Property Office and assigned Serial number 10-2014-0041171, the entire disclosure of which is hereby incorporated by reference.

TECHNICAL FIELD

The present disclosure relates to a media streaming method and an electronic device thereof.

BACKGROUND

With the development of information and communication technologies and semiconductor technologies, various types of electronic devices are being developed as multimedia devices that provide diverse multimedia services. For example, the electronic devices provide diverse multimedia services such as messenger services, broadcast services, wireless Internet services, camera services, and music playback services. The electronic devices include high-performance processors to achieve high network speeds and have enhanced hardware specifications to more rapidly perform a variety of functions.

For example, the electronic devices may provide Peer to Peer (P2P) services for sharing content with a counterpart electronic device through a direct connection thereto and may function as a server that provides content to the counterpart electronic device as well as a client that receives content.

The electronic devices may reproduce multimedia content, such as videos provided from content servers, after completely receiving the multimedia content through a download method or while receiving the multimedia content through a streaming method. For example, in the download method, the electronic devices download all multimedia content and then start to reproduce the multimedia content, and in the streaming method, the electronic devices continuously reproduce multimedia content while the multimedia content is being sequentially received.

The Real-Time Streaming Protocol (RTSP) is a representative example of the streaming protocol, and a server creates a session while connecting with a client. The session is used to maintain the playback state of the client and changes according to the client's command, such as playback, pause, and stop. While the session is being maintained, the server transmits media data in units of packets and functions as a flow control for transmitting an appropriate quantity of packets according to playback speeds.

The above information is presented as background information only to assist with an understanding of the present disclosure. No determination has been made, and no assertion is made, as to whether any of the above might be applicable as prior art with regard to the present disclosure.

SUMMARY

A real-time streaming service may be seamlessly achieved only when the current situation is rapidly provided to a client. However, when a network environment between the client and a server changes suddenly (or when a terminal is deficient in resources), for example, when a network bandwidth becomes narrower unexpectedly, much time is required for streaming the corresponding segment. Due to this, a buffering or freezing phenomenon arises in which a displayed video playback screen is temporarily stopped.

Aspects of the present disclosure are to address at least the above-mentioned problems and/or disadvantages and to provide at least the advantages described below. Accordingly, an aspect of the present disclosure is to provide a media streaming method and an electronic device thereof which may increase efficiency of data transmission in a real-time streaming service.

Another aspect of the present disclosure is to provide a media streaming method and an electronic device thereof which may reduce stream delay caused by a network or additional reasons.

Another aspect of the present disclosure is to provide a media streaming method and an electronic device thereof which may reduce a time difference of a streaming service between a server and a client, thereby ensuring real time.

Another aspect of the present disclosure is to provide a media streaming method and an electronic device thereof which may prevent network loads and efficiently manage resources.

In accordance with an aspect of the present disclosure, an operating method of a first electronic device is provided. The operating method includes transmitting stream data to a second electronic device, receiving, from the second electronic device, stream information associated with the stream data received by the second electronic device, and determining at least some of the stream data to transmit based on the received stream information.

In accordance with another aspect of the present disclosure, an operating method of a second electronic device is provided. The operating method includes receiving stream data from a first electronic device, and transmitting stream information associated with the received stream data to the first electronic device.

In accordance with another aspect of the present disclosure, a first electronic device is provided. The first electronic device includes a communication module, and a processor that is set to transmit stream data to a second electronic device through the communication module, to receive, from the second electronic device, stream information associated with the stream data received by the second electronic device, and to determine at least some of the stream data to transmit based on the received stream information.

In accordance with another aspect of the present disclosure, a non-transitory computer readable recording medium is provided. The non-transitory computer readable recording medium is executed by at least one processor to perform a method. The method includes transmitting, by a first electronic device, stream data to a second electronic device, receiving, from the second electronic device, stream information associated with the stream data received by the second electronic device, and determining at least some of the stream data to be transmitted to the second electronic device based on the received stream information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
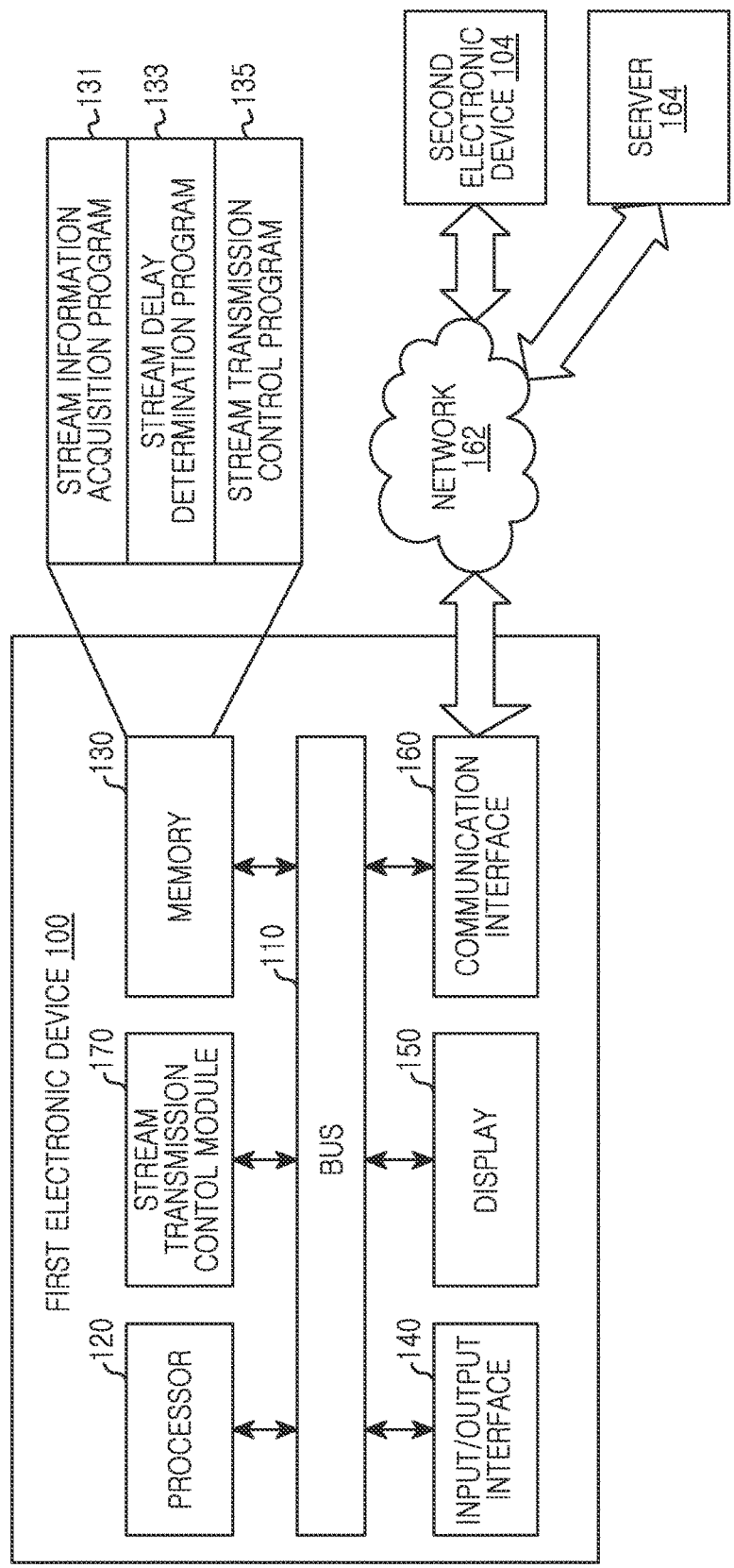
FIG. 1 is a block diagram of a first electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. Further, as used in various embodiments of the present disclosure, the terms "include", "have" and their conjugates may be construed to denote a certain characteristic, number, operation, constituent element, component or a combination thereof, but may not be construed to exclude the existence of or a possibility of addition of one or more other characteristics, numbers, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, without departing from the scope of the present disclosure, a first component element may be named a second component element. Similarly, the second component element also may be named the first component element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

In the present disclosure, the terms are used to describe a specific embodiment, and are not intended to limit the present disclosure.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video telephone, an e-book reader, a desktop PC, a laptop PC, a netbook computer, a Personal Digital Assistant (PDA), a Portable Multimedia Player (PMP), a Moving Picture Experts Group (MP3) player, a mobile medical appliance, a camera, a game machine, and a wearable device (e.g., a Head-Mounted-Device (HMD) such as electronic glasses, electronic clothing, an electronic bracelet, an electronic necklace, an electronic appcessory, an electronic tattoo, and a smart watch).

According to various embodiments of the present disclosure, the electronic device may be a smart home appliance with a communication function. The smart home appliance as an example of the electronic device may include at least one of, for example, a television (TV), a Digital Versatile Disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various kinds of medical appliances (e.g., a Magnetic Resonance Angiography (MRA) including a communication function, a Magnetic Resonance Imaging (MRI), a Computed Tomography (CT), a scanning machine, an ultrasonic machine, and the like), a navigation device, a Global Positioning System (GPS) receiver, an Event Data Recorder (EDR), a Flight Data Recorder (FDR), a vehicle infotainment device, electronic equipment for a ship (e.g., navigation equipment, a gyrocompass, and the like for a ship), avionics, a security appliance, and an industrial or home robot.

According to various embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like).

An electronic device according to various embodiments of the present disclosure may be a combination of one or more of above described various devices. Also, an electronic device according to various embodiments of the present disclosure is not limited to the above described devices.

Hereinafter, an electronic device according to various embodiments of the present disclosure will be described with reference to the accompanying drawings. In various embodiments of the present disclosure, the term "user" may indicate a person using an electronic device or a device (e.g. an artificial intelligence electronic device) using an electronic device.

According to various embodiments of the present disclosure, a first electronic device which will be described below may be a server that provides a streaming service. However, without being limited thereto, the first electronic device may also be a client that receives a streaming service. In addition, a second electronic device which will be described below may be a client that receives a streaming service. However, without being limited thereto, the second electronic device may also be a server that provides a streaming service. For example, the first electronic device or the second electronic device, which will be described below, may be a server or client depending upon the situation.

FIG. 1 is a block diagram of a first electronic device according to an embodiment of the present disclosure.

Referring to FIG. 1, a first electronic device 100 may include a bus 110, a processor 120, a memory 130, an input/output interface 140, a display 150, a communication interface 160, and a streaming transmission control module 170, but is not limited thereto. According to an embodiment of the present disclosure, the streaming transmission control module 170 may be operated while being included in the processor 120 or in conjunction with the processor 120 while being included in a separate module. The following description is made based on the assumption that the stream transmission control module 170 is operated while being included in the processor 120.

The bus 110 may be a circuit that interconnects the elements included in the first electronic device 100 (e.g., the processor 120, the memory 130, the input/output interface 140, the display 150, the communication interface 160, and the streaming transmission control module 170) and transfers communication (e.g., a control message) between the elements.

The processor 120 may receive instructions through the bus 110 from the elements included in the first electronic device 100, decode the received instructions, and perform calculations or data processing according to the decoded instructions. The processor 120 may execute at least one program stored in the memory 130 to provide a service corresponding to the relevant program.

According to an embodiment of the present disclosure, the processor 120 may transmit stream data to a second electronic device 104, to receive, from the second electronic device 104, stream information associated with the stream data received by the second electronic device 104, and to determine at least some stream data to transmit on the basis of the received stream information, by executing a stream information acquisition program 131, a stream delay determination program 133, and a stream transmission control program 135.

According to an embodiment of the present disclosure, the processor 120 may include one or more Application Processors (APs) or one or more Communication Processors (CPs). For example, the APs and the CPs may be included in the processor 120 or may be included in different Integrated Circuit (IC) packages, respectively. In addition, the APs and the CPs may be included in one IC package.

The APs may drive an operating system or application programs to control a plurality of hardware or software elements connected thereto and perform processing and calculations of various types of data including multimedia data. Here, the APs may be implemented as a System on Chip (SoC).

The CPs may perform at least some multimedia control functions. In addition, the CPs may distinguish between and authenticate mobile stations in a communication network using a subscriber identification module (SIM) (e.g., a SIM card). The CPs may provide a user with services including a voice call, a video call, a text message, or packet data. In addition, the CPs may control data transmission and reception of the communication interface 160.

The APs or the CPs may load instructions or data, received from at least one of the non-volatile memories connected thereto or the other elements, in volatile memories to process the instructions or data. The APs or the CPs may store data received from or generated by at least one of the other elements in non-volatile memories.

The CPs may perform a function of managing a data link and switching communication protocols in communication between an electronic device including hardware and other electronic devices connected to the electronic device via a network. Here, the CPs may be implemented as a SoC.

The processor 120 may include one or more data processors, image processors, and CODECs. In addition, in the first electronic device 100, the data processors, the image processors, or the CODECs may be separately constituted. According to an embodiment, the processor 120 may further include a Graphics Processing Unit (GPU).

The memory 130 may store instructions or data received from or generated by the one or more elements included in the first electronic device 100 (e.g., the processor 120, the input/output interface 140, the display 150, the communication interface 160, and the stream transmission control module 170).

The memory 130 may store one or more programs for services of the first electronic device 100. For example, the memory 130 may include the stream information acquisition program 131, the stream delay determination program 133, and the stream transmission control program 135. The respective programs may be constituted by programming modules, and the programming modules may be constituted by software, firmware, hardware, or a combination of two or more thereof.

According to an embodiment of the present disclosure, the stream information acquisition program 131 may include at least one software element for receiving stream information associated with stream data from the second electronic device 104 in cases where the stream data is transmitted to the second electronic device 104. For example, the stream information may include at least one of time stamp information of stream data currently displayed in the second electronic device 104, time stamp information of packets of stream data currently received by the second electronic device 104, and system time information of the second electronic device 104.

According to an embodiment of the present disclosure, the stream delay determination program 133 may include at least one software element for determining whether stream data is delayed based on received stream information. For example, the stream delay determination program 133 may analyze the received stream information or determine the delay of the stream data depending upon a network environment using system time information of the stream information.

According to an embodiment of the present disclosure, the stream transmission control program 135 may include at least one software element for adjusting the amount of stream data to transmit to the second electronic device 104. According to an embodiment of the present disclosure, the stream transmission control program 135, when determining that the currently transmitted stream data is delayed, may modify at least some stream data and then transmit the modified stream data in order to reduce the delay of the stream data. For example, the stream transmission control program 135 may not transmit a predetermined amount of stream data having an influence on a stream service. In another example, the stream transmission control program 135 may modify some stream data based on a designated value and then transmit the modified stream data.

According to an embodiment of the present disclosure, the memory 130 may include an internal memory or an external memory. The internal memory may include at least one of a volatile memory (e.g., a Dynamic Random Access Memory (DRAM), a Static RAM (SRAM), or a Synchronous DRAM (SDRAM)) and a non-volatile memory (e.g., a One Time Programmable Read Only Memory (OTPROM), a PROM, an Erasable and Programmable ROM (EPROM), an Electrically Erasable and Programmable ROM (EEPROM), a mask ROM, a flash ROM, a Not And (NAND) flash memory, or a Not Or (NOR) flash memory). For example, the internal memory may have a Solid State Drive (SSD) shape.

The external memory may include at least one of a Compact Flash (CF), a Secure Digital (SD), a Micro-SD, a Mini-SD, an extreme Digital (xD), and a memory stick.

According to an embodiment of the present disclosure, the memory 130 may further include a kernel, middleware, an Application Programming Interface (API), and applications.

The kernel may control or manage the system resources (e.g., the bus 110, the processor 120, and the memory 130) which are used to execute operations or functions implemented in the remaining other programming modules (e.g., the middleware, the API, and the applications). In addition, the kernel may provide an interface through which the middleware, the API, or the applications may access the individual elements of the first electronic device 100 to control or manage the elements.

The middleware may function as a relay to enable the API or the applications to communicate with the kernel to transfer data. In addition, the middleware may perform load balancing for operation requests, by using a method of assigning priorities to use the system resources of the first electronic device 100 (e.g., the bus 110, the processor 120, and the memory 130) to the operation requests received from at least one application.

The API, an interface through which the applications may control functions provided from the kernel or the middleware, may include at least one interface or function for a file control, a window control, an image processing control, or a text control.

The applications may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternatively, the applications may include an application related to an information exchange between the first electronic device 100 and an external electronic device (e.g., the second electronic device 104). Such an application related to an information exchange may include, for example, a notification transfer application for transferring particular information to an external electronic device or a device management application for managing an external electronic device.

For example, the notification transfer application may include a function of transferring, to an external electronic device (e.g., the second electronic device 104), notification information generated from the other applications of the first electronic device 100 (e.g., the SMS/MMS application, the e-mail application, the health management application, the environmental information application, and the like). Additionally or alternatively, the notification transfer application may, for example, receive notification information from an external electronic device (e.g., the second electronic device 104) to provide the notification information to a user. The device management application may manage (e.g., install, remove, or update) a function for at least a part of an external electronic device (e.g., the second electronic device 104) communicating with the first electronic device 100 (e.g., turning on/off the external electronic device (or some elements thereof) or controlling brightness (or resolution) of a display thereof), an application executed in the external electronic device, or a service provided by the external electronic device (e.g., a call service or a message service).

According to various embodiments of the present disclosure, the applications may include an application that is designated depending upon an attribute (e.g., a type) of an external electronic device (e.g., the second electronic device 104). For example, in cases where the external electronic device is an MP3 player, the applications may include an application related to the reproduction of music. Similarly, in cases where the external electronic device is a mobile medical appliance, the applications may include an application related to health care. According to an embodiment, the applications may include at least one of an application designated to the first electronic device 100 and an application received from an external electronic device (e.g., a server 164 or the second electronic device 104).

The input/output interface 140 may transfer instructions or data, which are input from a user through an input/output device (e.g., a sensor, a keyboard, or a touch screen), to the processor 120, the memory 130, the communication interface 160, or the stream transmission control module 170 through, for example, the bus 110. For example, the input/output interface 140 may provide, to the processor 120, data related to a user's touch input through a touch screen. In addition, for example, the input/output interface 140 may output, through an input/output device (e.g., a speaker or a display), instructions or data received through the bus 110 from the processor 120, the memory 130, the communication interface 160, or the stream transmission control module 170. For example, the input/output interface 140 may output voice data, which is processed through the processor 120, to a user through a speaker.

The display 150 may display various types of information (e.g., multimedia data, text data, or the like) to a user.

The communication interface 160 may connect communication between the first electronic device 100 and an external device (e.g., the second electronic device 104 or the server 164). For example, the communication interface 160 may be connected to a network 162 through wireless or wired communication to communicate with an external device. The wireless communication may include at least one of, for example, Wi-Fi, Bluetooth (BT), Near Field Communication (NFC), GPS and cellular communication (e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), Global System for Mobile communication (GSM), or the like). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a communication network. The communication network may include at least one of a computer network, the Internet, the Internet of things, and a telephone network. According to an embodiment of the present disclosure, a protocol (e.g., a transport layer protocol, data link layer protocol, or a physical layer protocol) for communication between the first electronic device 100 and an external device may be supported by at least one of the applications, the API, the middleware, the kernel, and the communication interface 160.

According to an embodiment of the present disclosure, the first electronic device 100 may further include a sensor module. The sensor module may include at least one of a gesture sensor, a gyro sensor, an atmospheric pressure sensor, a magnetic sensor, an acceleration sensor, a grip sensor, a proximity sensor, an image sensor, a biometric sensor, a body conduction sensor, a temperature sensor, a humidity sensor, an illumination sensor, and an Ultra Violet (UV) sensor. According to an embodiment of the present disclosure, the sensor module may measure a physical quantity or detect an operating state of the first electronic device 100 to convert the measured or detected information into an electric signal. For example, the sensor module may include an E-nose sensor, an electromyography (EMG) sensor, an electroencephalogram (EEG) sensor, an electrocardiogram (ECG) sensor, or a fingerprint sensor.

The names of the elements of the first electronic device 100 according to various embodiments of the present disclosure may vary with the type of the first electronic device 100. In addition, the first electronic device 100 may include one or more of the aforementioned elements according to the type thereof. Alternatively, some elements may be omitted or other additional elements may be further included in the first electronic device 100.

Figure 2:
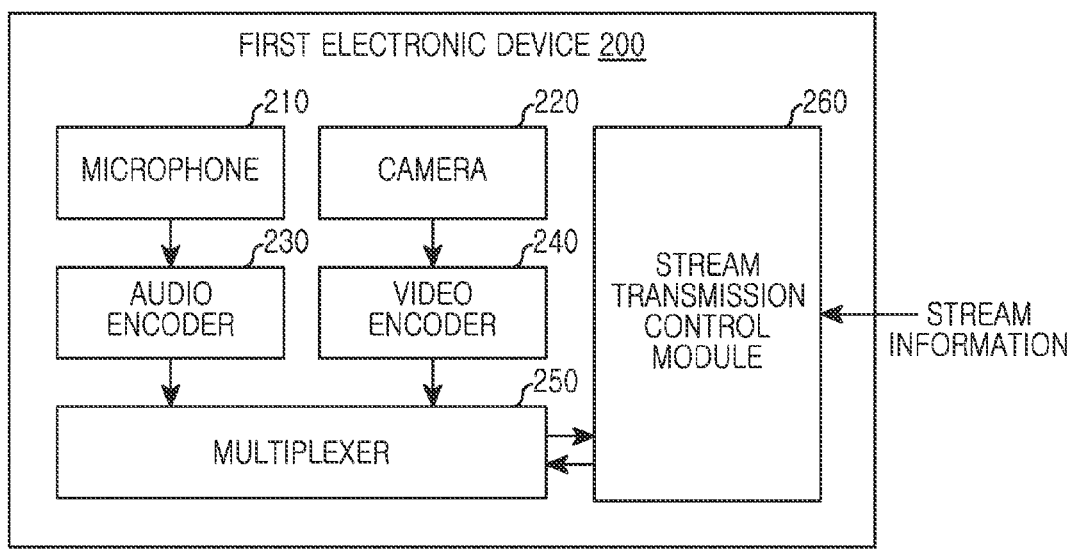
FIG. 2 is a media block diagram of a first electronic device according to an embodiment of the present disclosure.

FIG. 2 is a media block diagram of a first electronic device according to an embodiment of the present disclosure.

Figure 3:
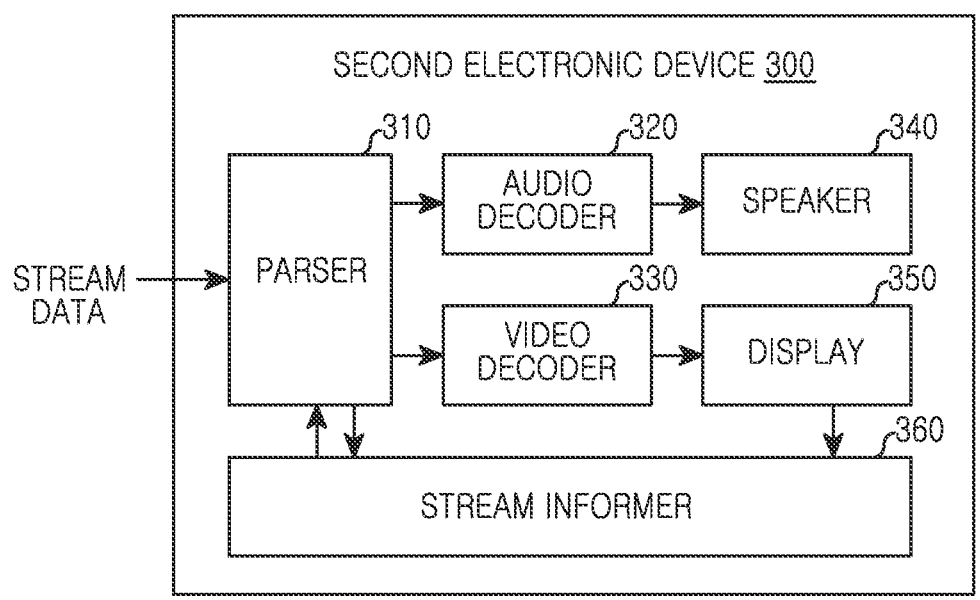
FIG. 3 is a media block diagram of a second electronic device according to an embodiment of the present disclosure.

FIG. 3 is a media block diagram of a second electronic device according to an embodiment of the present disclosure.

Referring to FIGS. 2 and 3, a first electronic device 200 which will be described below may include, for example, all or some elements of the first electronic device 100 illustrated in FIG. 1 and all or some elements of the stream transmission control module 170 illustrated in FIG. 1.

According to various embodiments of the present disclosure, the first electronic device 200 which will be described below may function as a server that provides a streaming service. However, without being limited thereto, the first electronic device 200 may also function as a client that receives a streaming service. In addition, a second electronic device 300 which will be described below may function as a client that receives a streaming service. However, without being limited thereto, the second electronic device 300 may also function as a server that provides a streaming service. For example, the first or second electronic device 200 or 300, which will be described below, may function as a server or client depending upon the situation.

The first electronic device 200 may create stream data to transmit to the second electronic device 300. According to an embodiment of the present disclosure, the first electronic device 200 may include a microphone 210, a camera 220, an audio encoder 230, a video encoder 240, a multiplexer 250, and a stream transmission control module 260.

According to an embodiment of the present disclosure, the microphone 210 may receive an input of voice data from the outside and provide the input voice data to the audio encoder 230. In addition, the camera 220 may receive an input of video data from the outside and provide the input video data to the video encoder 240.

According to an embodiment of the present disclosure, the audio encoder 230 may encode analog data into digital data in the manner of compressing the voice data received from the microphone 210. The audio encoder 230 may provide the encoded voice data to the multiplexer 250. In addition, the video encoder 240 may encode analog data into digital data in the manner of compressing the video data received from the camera 220. The video encoder 240 may provide the encoded video data to the multiplexer 250.

According to an embodiment of the present disclosure, the multiplexer 250 may process the audio data and the video data which are received from the audio encoder 230 and the video encoder 240, respectively, into one piece of stream data according to a reference time point. The multiplexer 250 may provide the created stream data to the stream transmission control module 260. For example, the multiplexer 250 may provide stream data stored therein to the stream transmission control module 260. In another example, the multiplexer 250 may provide, to the stream transmission control module 260, stream data received from another electronic device.

According to an embodiment of the present disclosure, the stream transmission control module 260 may adjust the amount of stream data to transmit to the second electronic device 300, with the stream information acquisition program 131, the stream delay determination program 133, and the stream transmission control program 135 which act as an element thereof. For example, the stream transmission control module 260 may receive stream information of currently transmitted stream data from a stream informer 360 of the second electronic device 300 and determine whether the currently transmitted stream data is delayed based on the stream information. For example, the stream information may include at least one of time stamp information of stream data currently displayed in the second electronic device 300, time stamp information of packets of stream data currently received by the second electronic device 300, and system time information of the second electronic device 300. According to an embodiment of the present disclosure, the first and second electronic devices 200 and 300 may transmit and receive stream data and stream information using a Transmission Control Protocol (TCP) connection method.

According to an embodiment of the present disclosure, the stream transmission control module 260, when determining that the currently transmitted stream data is delayed, may modify at least some stream data and then transmit the modified stream data in order to reduce the delay of the stream data. For example, the stream transmission control module 260 may not to transmit a predetermined amount of stream data having an influence on a stream service. In another example, the stream transmission control module 260 may modify some stream data based on a designated value and then transmit the modified stream data.

Figure 4:
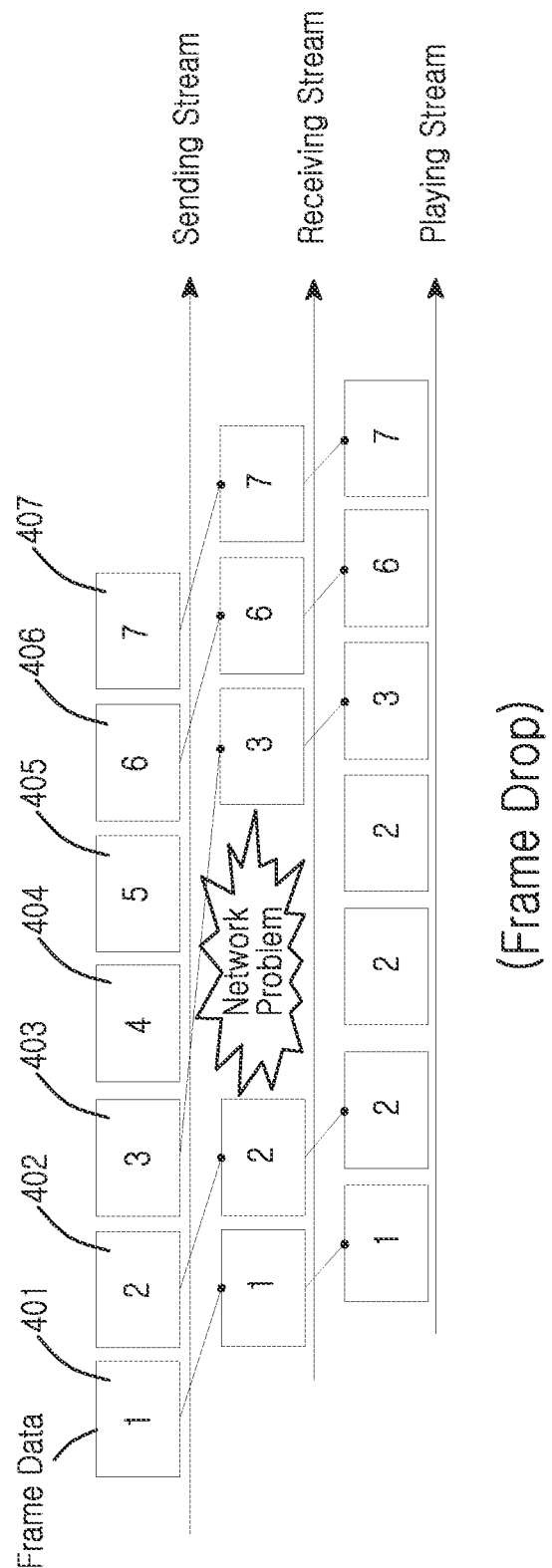
FIG. 4 is a view for illustrating a frame drop method according to an embodiment of the present disclosure.

FIG. 4 is a view for illustrating a frame drop method according to an embodiment of the present disclosure.

According to an embodiment of the present disclosure, based on the received stream information, the stream transmission control module 260 may identify the current network situation and the situation of the second electronic device 300 where a stream service is delayed. For example, referring to FIG. 4, the stream transmission control module 260 may remove some data 404 and 405 from stream data 401 to 407 using a frame drop method to transmit the stream data. According to an embodiment of the present disclosure, through the frame drop method, the stream transmission control module 260 may reduce delay of the generated stream data to prevent a predetermined portion (e.g., some data 404 and 405) of the stream data which will be reproduced from being transmitted to the second electronic device 300.

Figure 5:
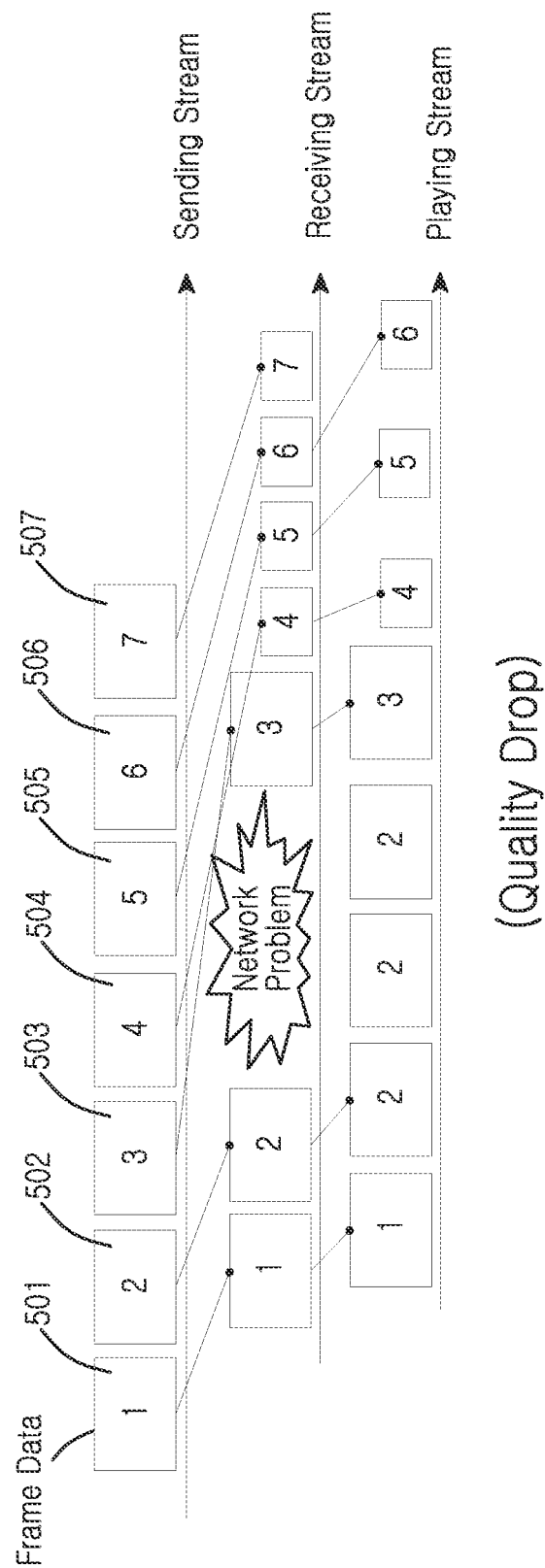
FIG. 5 is a view for illustrating a quality drop method according to an embodiment of the present disclosure.

FIG. 5 is a view for illustrating a quality drop method according to an embodiment of the present disclosure.

According to an embodiment of the present disclosure, through the frame drop method, the stream transmission control module 260 may exclude some data 404 and 405 of the actual stream data to reduce playing time of the transmitted stream data. For example, the stream transmission control module 260 may not transmit data of frames that have to be shown in a media player of the second electronic device 300, thereby reducing a time difference between stream data transmitted by the first electronic device 200 and stream data shown at the same time in the media player of the second electronic device 300.

In another example, referring to FIG. 5, the stream transmission control module 260 may modify some data 504 to 507 of stream data 501 to 507 using a quality drop method to transmit the stream data. According to an embodiment of the present disclosure, through the quality drop method, the stream transmission control module 260 may reduce delay of stream data which may be generated afterwards to decrease the amount of stream data to transmit to the second electronic device 300.

According to an embodiment of the present disclosure, through the quality drop method, the stream transmission control module 260 may reduce the size of stream data to transmit to the second electronic device 300 to transmit the stream data within a short period of time. However, the same time is required to show a frame of each stream data. Therefore, a time difference between stream data transmitted by the first electronic device 200 and stream data shown at the same time in the media player of the second electronic device 300 may be maintained rather than being decreased.

According to an embodiment of the present disclosure, in cases where currently transmitted stream data is delayed, the stream transmission control module 260 may transmit the stream data by modifying a frame of the stream data that a change in a screen is small. According to an embodiment of the present disclosure, the stream transmission control module 260 may transmit the stream data by modifying a frame having a data size smaller than a reference value among frames of the stream data. For example, the size of a frame of the stream data may be determined depending upon a change in display between the frame and the preceding frame, and a frame with a small change in display may accordingly have a relatively small size. According to an embodiment of the present disclosure, the stream transmission control module 260 may transmit the stream data by removing a frame in which a change in frame shown to a user is smaller than a reference value among frames of the stream data. According to an embodiment of the present disclosure, the stream transmission control module 260 may reduce the amount of data to be lost by selecting and dropping a frame having a relatively small frame size.

According to an embodiment of the present disclosure, in cases where currently transmitted stream data is delayed, the stream transmission control module 260 may adjust the image quality of the transmitted stream data using system time information among the received stream information. For example, the system time information may be a reference time for determining the amount of delayed stream data.

According to an embodiment of the present disclosure, Table 1 below is a reference table for determining delay of stream data according to a network environment using system time information.

TABLE 1

| System Time (sec) | Receiving Time (sec) | Playing Time (sec) |
|---|---|---|
| 0 | 0 | 0 |
| 30 | 30 | 24 |
| 60 | 56 | 55 |

Referring to Table 1 above, information on stream data received after 30 seconds may be the same as system time information. In addition, Table 1 may represent that the current network environment may accept the image quality of the transmitted stream data. For example, since playing time is less than 30 seconds, this case may represent that stream delay in the past has an influence on the current playing time as well. According to an embodiment of the present disclosure, since both information on stream data received after 60 seconds and information on reproduced stream data are reduced, this case may represent that the allocated network cannot process the current image quality. Accordingly, the stream transmission control module 260 may lower a data transmission rate of the transmitted stream data and may modify stream data corresponding to a predetermined playing time and transmit the same in order to recover the already occurred time difference between the stream data the first electronic device 200 is transmitting and the stream data the second electronic device 300 is reproducing. However, without being limited thereto, various situations in addition to the aforementioned network situation may exist, and in these cases, the stream transmission control module 260 may decrease stream data to be transmitted so as to correspond to the respective situations.

According to an embodiment of the present disclosure, the second electronic device 300 may receive stream data from the first electronic device 200. The second electronic device 300 may display the received stream data. According to an embodiment of the present disclosure, the second electronic device 300 may include a parser 310, an audio decoder 320, a video decoder 330, a speaker 340, a display 350, and the stream informer 360.

According to an embodiment of the present disclosure, the parser 310 may parse the stream data received from the first electronic device 200. The parser 310 may analyze or decompose the stream data such that the received stream data may be decoded by the audio decoder 320 or the video decoder 330. The parser 310 may provide the encoded voice data of the parsed stream data to the audio decoder 320 and the encoded video data to the video decoder 330. For example, the parser 310 may parse the received stream data and provide head information and time stamp information of the packets of the stream data to the stream informer 360.

According to an embodiment of the present disclosure, the audio decoder 320 may decode the encoded voice data received from the parser 310 into analog data. The audio decoder 320 may provide the decoded voice data to the speaker 340. In addition, the video decoder 330 may decode the encoded video data received from the parser 310 into analog data. The video decoder 330 may provide the decoded video data to the display 350.

According to an embodiment of the present disclosure, the speaker 340 may convert the voice data received from the audio decoder 320 into a signal in the audio frequency band to output the same. In addition, the display 350 may output the video data received from the video decoder 330 as a graphic image.

According to an embodiment of the present disclosure, the stream informer 360 may acquire stream information to transmit to the stream transmission control module 260 of the first electronic device 200. For example, the stream information may include at least one of time stamp information of the currently displayed stream data, time stamp information of packets of the currently received stream data, and system time information of the second electronic device 300.

According to an embodiment of the present disclosure, the stream informer 360 may receive time stamp information of currently displayed stream data from an API. For example, the time stamp information of the currently displayed stream data may be replaced by time stamp information of stream data currently provided from a media player. According to an embodiment of the present disclosure, the stream informer 360 may receive time stamp information of packets of the currently received stream data from the parser 310. According to an embodiment of the present disclosure, the stream informer 360 may receive time stamp information through an API provided from an operating system (OS). However, without being limited thereto, the aforementioned stream information may be acquired through various methods. According to an embodiment of the present disclosure, the second electronic device 300 may transmit, to the first electronic device 200, stream information acquired at every predetermined time or at a designated time.

According to various embodiments of the present disclosure, a first electronic device may include: a communication module; and a processor that is set to transmit stream data to a second electronic device through the communication module, to receive, from the second electronic device, stream information associated with the stream data received by the second electronic device, and to determine at least some of the stream data to transmit based on the received stream information.

According to various embodiments of the present disclosure, the processor may be set to determine whether the stream data is delayed on the basis of the received stream information.

According to various embodiments of the present disclosure, the processor may be set to determine whether the stream data is delayed, by comparing receiving time and playing time of the stream data based on the stream information.

According to various embodiments of the present disclosure, the stream information may include at least one of time stamp information of the stream data, time stamp information of packets of the stream data, and time stamp information of the second electronic device.

According to various embodiments of the present disclosure, the processor may be set to modify at least some of the stream data determined to be transmitted and transmit the modified stream data.

According to various embodiments of the present disclosure, the processor may be set to determine a frame of the stream data having a data size smaller than a reference value.

According to various embodiments of the present disclosure, the processor may be set to determine a frame of the stream data in which a change in a frame that is shown to a user is smaller than a reference value.

Figure 6:
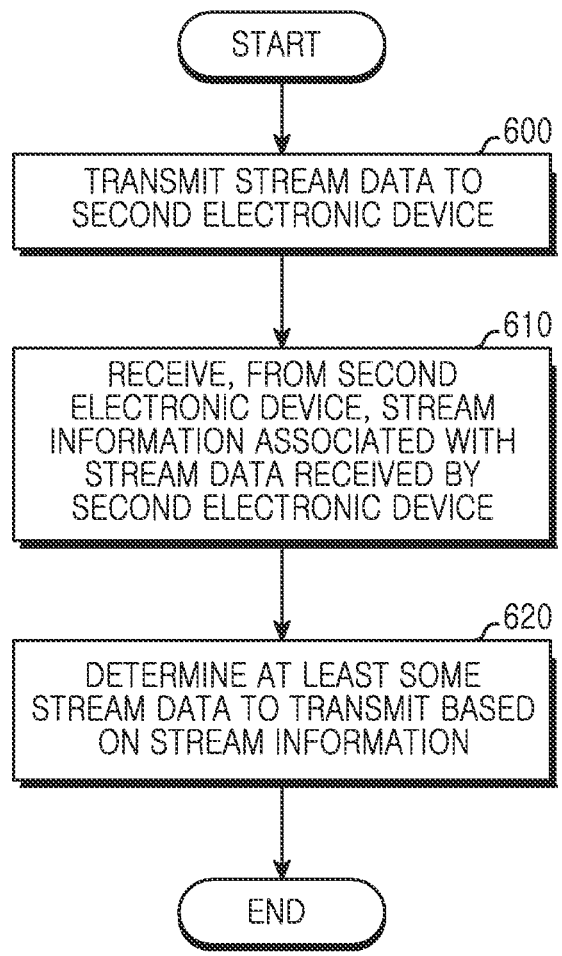
FIG. 6 is a flowchart illustrating a procedure for modifying some stream data to be transmitted and transmitting the modified stream data when stream data of a first electronic device is transmitting is delayed according to an embodiment of the present disclosure.

FIG. 6 is a flowchart illustrating a procedure for modifying some stream data to be transmitted and transmitting the modified stream data when stream data of a first electronic device is transmitting is delayed according to an embodiment of the present disclosure.

According to various embodiments of the present disclosure, the first electronic device 200 which will be described below may function as a server that provides a streaming service. However, without being limited thereto, the first electronic device 200 may also be a client that receives a streaming service. In addition, the second electronic device 300 which will be described below may function as a client that receives a streaming service. However, without being limited thereto, the second electronic device 300 may also function as a server that provides a streaming service. For example, the first electronic device 200 or the second electronic device 300, which will be described below, may function as a server or client depending upon the situation.

Referring to FIG. 6, the first electronic device 200 may transmit stream data to the second electronic device 300 in operation 600. According to an embodiment of the present disclosure, the first electronic device 200 may create the stream data to transmit to the second electronic device 300. According to an embodiment of the present disclosure, the first electronic device 200 may transmit stream data stored therein to the second electronic device 300. According to an embodiment of the present disclosure, the first electronic device 200 may transmit, to the second electronic device 300, stream data received from another electronic device. According to an embodiment of the present disclosure, the first and second electronic devices 200 and 300 may transmit and receive stream data using a TCP connection method.

In operation 610, the first electronic device 200 may receive, from the second electronic device 300, stream information associated with the stream data received by the second electronic device 300. For example, the stream information may include at least one of time stamp information of stream data currently displayed in the second electronic device 300, time stamp information of packets of stream data currently received by the second electronic device 300, and system time information of the second electronic device 300.

According to an embodiment of the present disclosure, the second electronic device 300 may receive time stamp information of the currently displayed stream data from an API. For example, the time stamp information of the currently displayed stream data may be replaced by time stamp information of stream data currently provided from a media player. According to an embodiment of the present disclosure, the second electronic device 300 may receive time stamp information of packets of the stream data currently received from a parser. According to an embodiment, the second electronic device 300 may receive time stamp information through an API provided from an OS. However, without being limited thereto, the aforementioned stream information may be acquired through various methods. According to an embodiment of the present disclosure, the second electronic device 300 may transmit, to the first electronic device 200, stream information acquired every predetermined time or at designated time.

In operation 620, the first electronic device 200 may determine at least some stream data to be transmitted based on the received stream information. According to an embodiment of the present disclosure, the first electronic device 200 may determine whether the stream data is delayed based on the received stream information. According to an embodiment of the present disclosure, the first electronic device 200 may analyze the received stream information or determine the delay of the stream data depending upon a network environment using system time information of the stream information. According to an embodiment of the present disclosure, the first electronic device 200 may determine whether the stream data is delayed by comparing receiving time and playing time of the stream data based on the stream information.

According to an embodiment of the present disclosure, the first electronic device 200 may modify at least some stream data determined as data to be transmitted and transmit the modified stream data. For example, the first electronic device 200 may not to transmit a predetermined amount of stream data having an influence on a stream service. In another example, the first electronic device 200 may modify some stream data based on a designated value and then transmit the modified stream data.

According to an embodiment of the present disclosure, based on the received stream information, the first electronic device 200 may identify the current network situation and the situation of the second electronic device 300 where a stream service is delayed. For example, the first electronic device 200 may modify some stream data using a frame drop method or a quality drop method and transmit the modified stream data. According to an embodiment of the present disclosure, through the frame drop method, the first electronic device 200 may reduce the delay of the generated stream data to prevent a predetermined portion of the stream data which will be reproduced from being transmitted to the second electronic device 300. In addition, through the quality drop method, the first electronic device may 200 reduce delay of stream data which may be generated afterwards to decrease the amount of stream data to transmit to the second electronic device 300.

According to an embodiment of the present disclosure, through the frame drop method, the first electronic device 200 may exclude some of the actual stream data to reduce playing time of the transmitted stream data. For example, the first electronic device 200 may not transmit data of frames that have to be shown in a media player of the second electronic device 300, thereby reducing a time difference between stream data transmitted by the first electronic device 200 and stream data shown at the same time in the media player of the second electronic device 300. According to an embodiment of the present disclosure, through the quality drop method, the first electronic device 200 may reduce the size of stream data to transmit to the second electronic device 300 to transmit the stream data within a short period of time. However, the time required to show a frame of each stream data is the same. Therefore, a time difference between stream data transmitted by the first electronic device 200 and stream data shown at the same time in the media player of the second electronic device 300 may be maintained rather than be decreased. According to an embodiment of the present disclosure, in cases where currently transmitted stream data is delayed, the first electronic device 200 may transmit the stream data by modifying frames of the stream data that a change in a screen is small. According to an embodiment of the present disclosure, the first electronic device may transmit the stream data by modifying a frame having a data size smaller than a reference value among frames of the stream data. For example, the size of a frame of the stream data may be determined depending upon a change in display between the frame and the preceding frame, and a frame with a small change in display may accordingly have a relatively small size. According to an embodiment of the present disclosure, the first electronic device 200 may transmit the stream data by removing a frame having a data size smaller than a reference value among frames of the stream data. According to an embodiment of the present disclosure, the first electronic device 200 may reduce the amount of data to be lost by selecting and dropping a frame having a relatively small frame size. According to an embodiment of the present disclosure, in cases where currently transmitted stream data is delayed, the first electronic device 200 may adjust the image quality of the transmitted stream data using system time information among the received stream information. However, without being limited thereto, some of the stream data may be modified through various methods.

Figure 7:
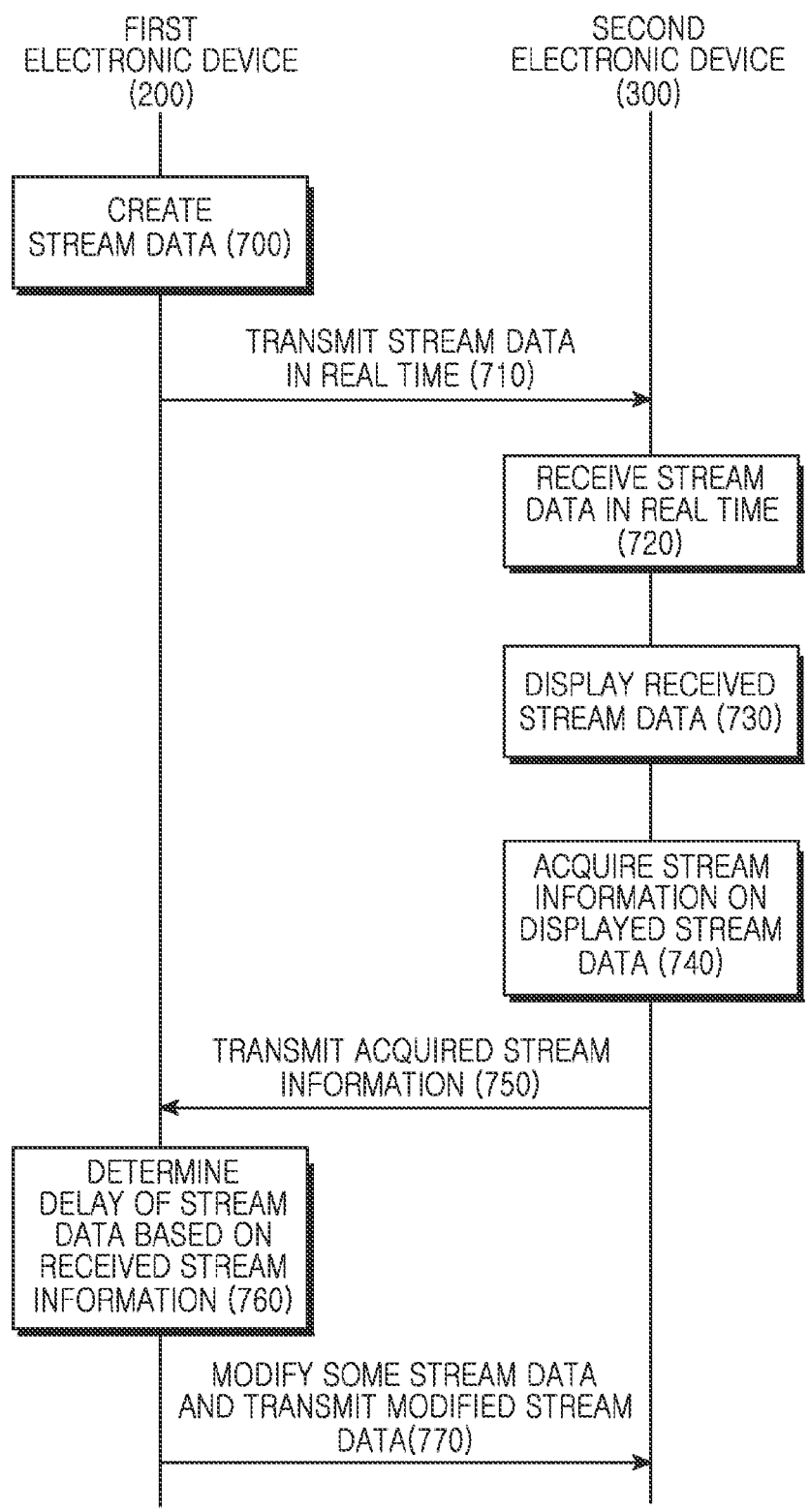
FIG. 7 is a flowchart illustrating a procedure for modifying some stream data to be transmitted and transmitting the modified stream data when stream data of a first electronic device is transmitting is delayed according to an embodiment of the present disclosure.

FIG. 7 is a flowchart illustrating a procedure for modifying some stream data to be transmitted and transmitting the modified stream data when stream data of a first electronic device is transmitting is delayed according to an embodiment of the present disclosure.

According to various embodiments of the present disclosure, the first electronic device 200 which will be described below may function as a server that provides a streaming service. However, without being limited thereto, the first electronic device 200 may also function as a client that receives a streaming service. In addition, the second electronic device 300 which will be described below may function as a client that receives a streaming service. However, without being limited thereto, the second electronic device 300 may also function as a server that provides a streaming service. For example, the first electronic device 200 or the second electronic device 300, which will be described below, may function as a server or client depending upon the situation.

Referring to FIG. 7, the first electronic device 200 may create stream data in operation 700. According to an embodiment of the present disclosure, the first electronic device 200 may acquire stream data to transmit to the second electronic device 300. According to an embodiment of the present disclosure, the first electronic device 200 may select stream data stored therein. According to an embodiment of the present disclosure, the first electronic device 200 may select stream data received from another electronic device.

In operation 710, the first electronic device 200 may transmit the stream data to the second electronic device 300 in real time. In operation 720, the second electronic device 300 may receive the stream data from the first electronic device 200 in real time. According to an embodiment of the present disclosure, the first and second electronic devices 200 and 300 may transmit and receive the stream data using a TCP connection method. In operation 730, the second electronic device 300 may display the received stream data. According to an embodiment of the present disclosure, the second electronic device 300 may output the received stream data as a voice or an image.

In operation 740, the second electronic device 300 may acquire stream information associated with the displayed stream data. For example, the stream information may include at least one of time stamp information of the stream data currently displayed in the second electronic device 300, time stamp information of packets of the stream data currently received by the second electronic device 300, and system time information of the second electronic device 300.

According to an embodiment of the present disclosure, the second electronic device 300 may receive time stamp information of the currently displayed stream data from an API. For example, the time stamp information of the currently displayed stream data may be replaced by time stamp information of stream data currently provided from a media player. According to an embodiment of the present disclosure, the second electronic device 300 may receive time stamp information of packets of the stream data currently received from a parser. According to an embodiment of the present disclosure, the second electronic device 300 may receive time stamp information through an API provided from an OS. However, without being limited thereto, the aforementioned stream information may be acquired through various methods.

In operation 750, the second electronic device 300 may transmit the acquired stream information to the first electronic device 200. According to an embodiment of the present disclosure, the second electronic device 300 may transmit, to the first electronic device 200, stream information acquired every predetermined time or at designated time.

In operation 760, the first electronic device 200 may determine whether the stream data is delayed based on the received stream information. According to an embodiment of the present disclosure, the first electronic device 200 may analyze the received stream information or determine the delay of the stream data depending upon a network environment using system time information of the stream information.

In operation 770, the first electronic device 200 may modify some of the stream data and transmit the modified stream data. For example, the first electronic device 200 may make a control not to transmit a predetermined amount of stream data having an influence on a stream service. In another example, the first electronic device 200 may modify some of the stream data based on a designated value and then transmit the modified stream data. According to an embodiment of the present disclosure, based on the received stream information, the first electronic device 200 may identify the current network situation and the situation of the second electronic device 300 where a stream service is delayed. For example, the first electronic device 200 may modify some of the stream data using a frame drop method or a quality drop method and transmit the modified stream data.

Figure 8:
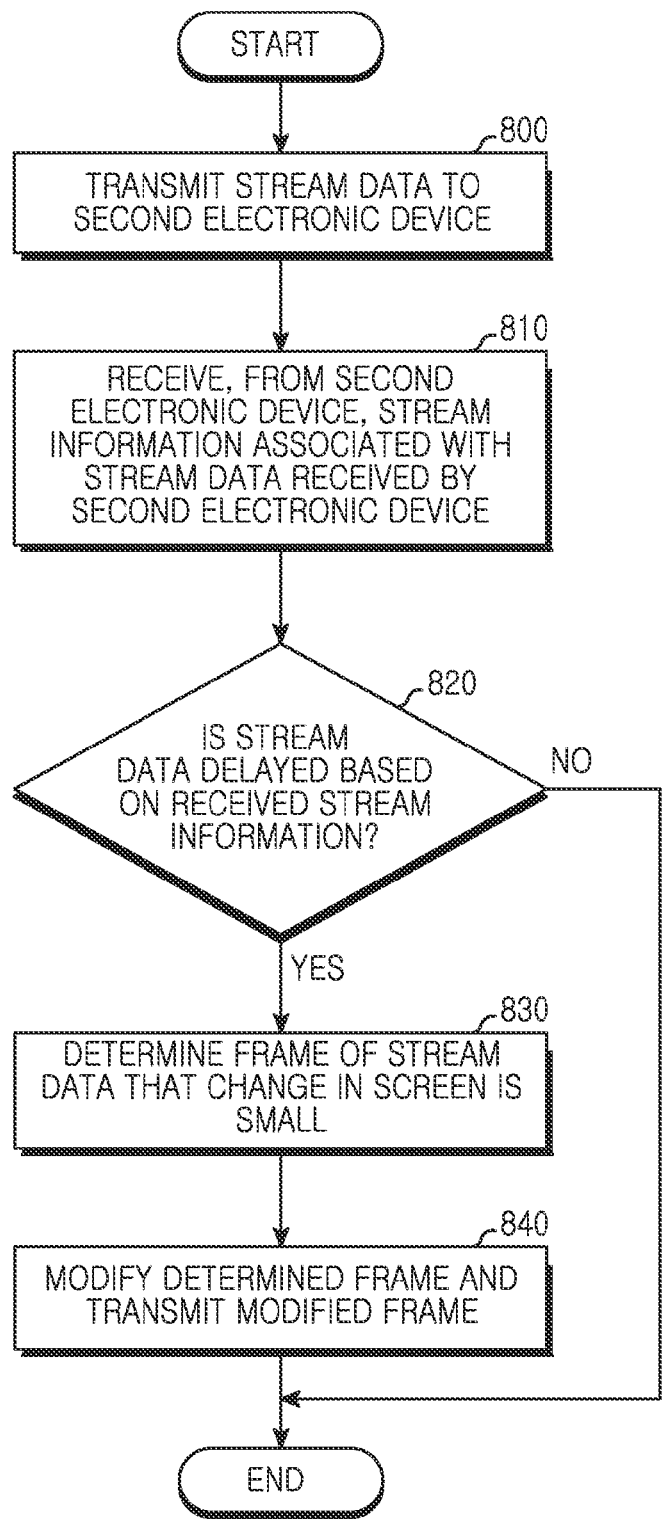
FIG. 8 is a flowchart illustrating a procedure for modifying some stream data to be transmitted and transmitting the modified stream data when stream data of a first electronic device is transmitting is delayed according to an embodiment of the present disclosure.

FIG. 8 is a flowchart illustrating a procedure for modifying some stream data to be transmitted and transmitting the modified stream data when stream data of a first electronic device is transmitting is delayed according to an embodiment of the present disclosure.

Referring to FIG. 8, the first electronic device 200 may transmit stream data to the second electronic device 300 in operation 800. According to an embodiment of the present disclosure, the first electronic device 200 may acquire stream data to transmit to the second electronic device 300. According to an embodiment of the present disclosure, the first electronic device 200 may transmit stream data stored therein to the second electronic device 300. According to an embodiment of the present disclosure, the first electronic device 200 may transmit, to the second electronic device 300, stream data received from another electronic device. According to an embodiment of the present disclosure, the first and second electronic devices 200 and 300 may transmit and receive the stream data using a TCP connection method.

In operation 810, the first electronic device 200 may receive, from the second electronic device 300, stream information associated with the stream data received by the second electronic device 300. For example, the stream information may include at least one of time stamp information of the stream data currently displayed in the second electronic device 300, time stamp information of packets of the stream data currently received by the second electronic device 300, and system time information of the second electronic device 300.

According to an embodiment of the present disclosure, the second electronic device 300 may receive time stamp information of the currently displayed stream data from an API. For example, the time stamp information of the currently displayed stream data may be replaced by time stamp information of stream data currently provided from a media player. According to an embodiment of the present disclosure, the second electronic device 300 may receive time stamp information of packets of the stream data currently received from a parser. According to an embodiment of the present disclosure, the second electronic device 300 may receive time stamp information through an API provided from an OS. However, without being limited thereto, the aforementioned stream information may be acquired through various methods. According to an embodiment of the present disclosure, the second electronic device 300 may transmit, to the first electronic device 200, stream information acquired every predetermined time or at designated time.

In operation 820, the first electronic device 200 may determine whether the stream data is delayed based on the received stream information. According to an embodiment of the present disclosure, the first electronic device 200 may analyze the received stream information or determine the delay of the stream data depending upon a network environment using system time information of the stream information.

When the stream data is delayed, the first electronic device 200 may determine, in operation 830, a frame of the stream data that a change in a screen is small. According to an embodiment of the present disclosure, the first electronic device 200 may detect a frame of the stream data in which a change in frame is smaller than a reference value. In operation 840, the first electronic device 200 may modify the determined frame and transmit the modified frame. According to an embodiment of the present disclosure, the first electronic device 200 may reduce the amount of data to be lost by selecting and dropping a frame having a relatively small frame size.

According to various embodiments of the present disclosure, an operating method of a first electronic device may include: transmitting stream data to a second electronic device; receiving, from the second electronic device, stream information associated with the stream data received by the second electronic device; and determining at least some of the stream data to transmit based on the received stream information.

According to various embodiments of the present disclosure, the determining of at least some of the stream data to transmit based on the received stream information may include determining whether the stream data is delayed on the basis of the received stream information.

According to various embodiments of the present disclosure, the determining of whether the stream data is delayed may include comparing receiving time and playing time of the stream data based on the stream information.

According to various embodiments of the present disclosure, the stream information may include at least one of time stamp information of the stream data, time stamp information of packets of the stream data, and system time information of the second electronic device.

According to various embodiments of the present disclosure, the operating method may further include modifying at least some of the stream data determined to be transmitted and transmitting the modified stream data.

According to various embodiments of the present disclosure, the stream data may be transmitted through a TCP connection method.

According to various embodiments of the present disclosure, the at least some determined stream data may include a frame of the stream data having a data size smaller than a reference value.

According to various embodiments of the present disclosure, the at least some determined stream data may include a frame of the stream data in which a change in frame that is shown to a user is smaller than a reference value.

According to various embodiments of the present disclosure, the at least some determined stream data may include a frame that is not displayed in the second electronic device.

According to various embodiments of the present disclosure, an operating method of a second electronic device may include: receiving stream data from a first electronic device; and transmitting stream information associated with the received stream data to the first electronic device.

According to various embodiments of the present disclosure, the stream information may include at least one of time stamp information of the stream data, time stamp information of packets of the stream data, and system time information of the second electronic device.

According to various embodiments of the present disclosure, the stream information may be transmitted every particular time or at designate time.

Figure 9:
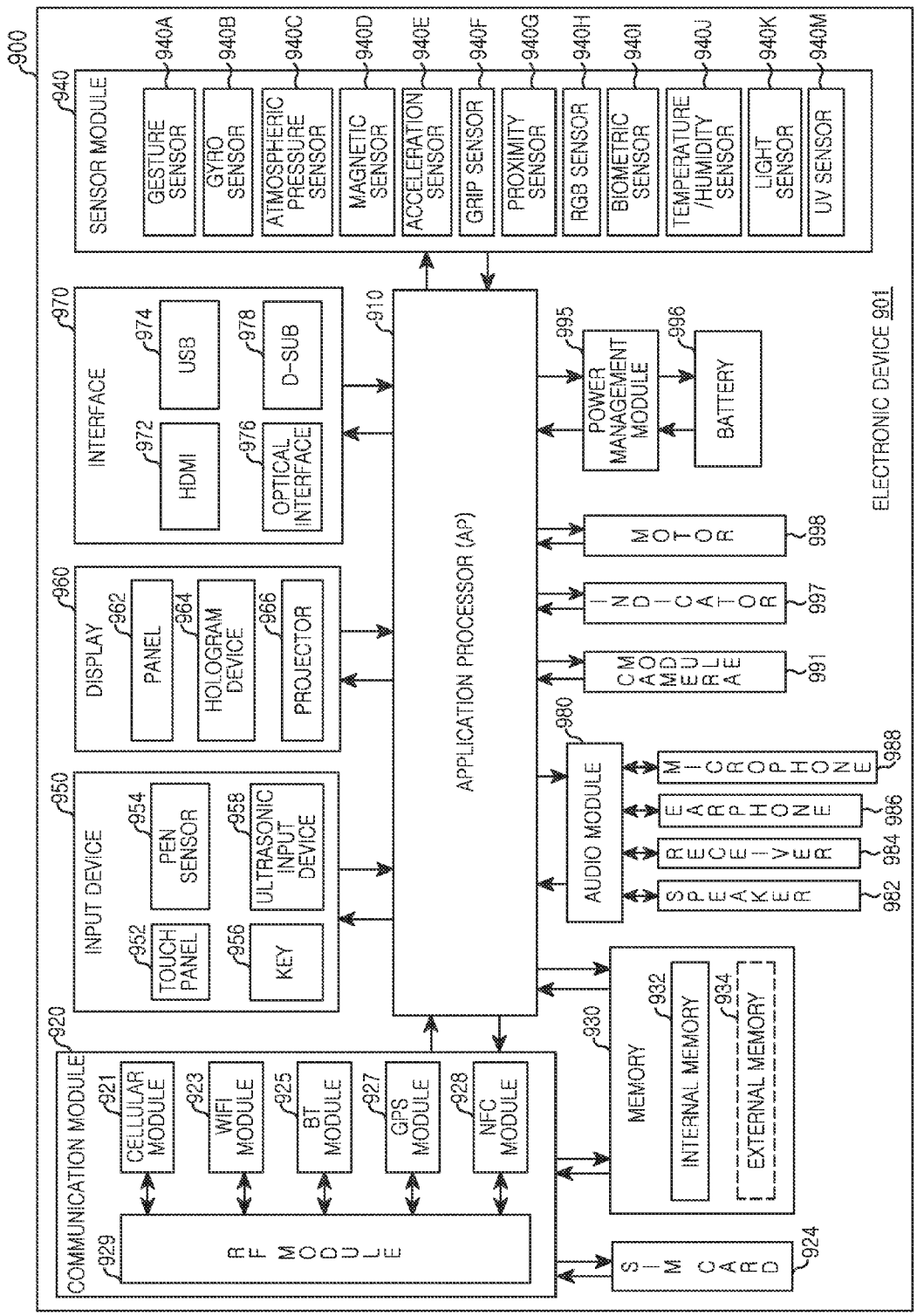
FIG. 9 is a block diagram of a first electronic device according to various embodiments of the present disclosure.

FIG. 9 is a block diagram of a first electronic device according to various embodiments of the present disclosure. The first electronic device may constitute, for example, the entirety or a part of the first electronic device 100 illustrated in FIG. 1.

Referring to FIG. 9, is a block diagram 900 of a first electronic device 901. The first electronic device 901 may include at least one AP 910, a communication module 920, a SIM card 924, a memory 930, a sensor module 940, an input device 950, a display 960, an interface 970, an audio module 980, a camera module 991, a power management module 995, a battery 996, an indicator 997, and a motor 998.

The AP 910 may drive an operating system or application programs to control a plurality of hardware or software elements connected thereto and perform processing and calculations of various types of data including multimedia data. The AP 910 may be implemented as, for example, a SoC. According to an embodiment of the present disclosure, the AP 910 may further include a GPU.

The communication module 920 may transmit/receive data in communication between the first electronic device 901 (e.g., the first electronic device 100) and other electronic devices (e.g., the second electronic device 104 and the server 164) connected thereto through a network. According to an embodiment of the present disclosure, the communication module 920 may include a cellular module 921, a Wi-Fi module 923, a BT module 925, a GPS module 927, an NFC module 928, and a Radio Frequency (RF) module 929.

The cellular module 921 may provide a voice call, a video call, an SMS, or an Internet service through a communication network (e.g., LTE, LTE-A, CDMA, WCDMA, UMTS, WiBro, or GSM). In addition, the cellular module 921 may distinguish between and authenticate electronic devices in a communication network using, for example, a subscriber identification module (e.g., the SIM card 924). According to an embodiment of the present disclosure, the cellular module 921 may perform at least some functions which the AP 910 may provide. For example, the cellular module 921 may perform at least some of the multimedia control functions.

According to an embodiment, the cellular module 921 may include a CP. In addition, the cellular module 921 may be implemented as, for example, a SoC. In FIG. 9, the elements such as the cellular module 921 (e.g., a communication processor), the memory 930, and the power management module 995 are illustrated to be separate from the AP 910. However, according to an embodiment of the present disclosure, the AP 910 may be implemented to include at least some (e.g., the cellular module 921) of the aforementioned elements.

According to an embodiment of the present disclosure, the AP 910 or the cellular module 921 (e.g., the communication processor) may load instructions or data, received from at least one of non-volatile memories and other elements connected thereto, in a volatile memory and process the loaded instructions or data. In addition, the AP 910 or the cellular module 921 may store data received from or generated by at least one of the other elements in a non-volatile memory.

The Wi-Fi module 923, the BT module 925, the GPS module 927, and the NFC module 928 may include, for example, a processor for processing data transmitted/received through the corresponding module. In FIG. 9, the cellular module 921, the Wi-Fi module 923, the BT module 925, the GPS module 927, or the NFC module 928 is illustrated as a separate block. However, according to an embodiment of the present disclosure, at least some (e.g., two or more) of the cellular module 921, the Wi-Fi module 923, the BT module 925, the GPS module 927, and the NFC module 928 may be included in one IC or one IC package. For example, at least some (e.g., the communication processor corresponding to the cellular module 921 and the Wi-Fi processor corresponding to the Wi-Fi module 923) of the processors corresponding to the cellular module 921, the Wi-Fi module 923, the BT module 925, the GPS module 927, and the NFC module 928 may be implemented as one SoC.

The RF module 929 may transmit/receive data, for example, an RF signal. Although not illustrated, the RF module 929 may include, for example, a transceiver, a Power Amp Module (PAM), a frequency filter, or a Low Noise Amplifier (LNA). In addition, the RF module 929 may further include an element, for example a conductor or a conducting wire, for transmitting/receiving electronic waves over a free air space in wireless communication. In FIG. 9, the cellular module 921, the Wi-Fi module 923, the BT module 925, the GPS module 927, and the NFC module 928 share one RF module 929. However, according to an embodiment of the present disclosure, at least one of the cellular module 921, the Wi-Fi module 923, the BT module 925, the GPS module 927, and the NFC module 928 may transmit/receive an RF signal through a separate RF module.

The SIM card 924 may be a card including a subscriber identification module and may be inserted into a slot formed in a particular position of the first electronic device. The SIM card 924 may include unique identification information (e.g., an integrated circuit card identifier (ICCID)) or subscriber information (e.g., an international mobile subscriber identity (IMSI)).

The memory 930 (e.g., the memory 130) may include an internal memory 932 or an external memory 934. For example, the internal memory 932 may include at least one of volatile memories (e.g., a DRAM, an SRAM, an SDRAM, and the like) and non-volatile memories (e.g., an OTPROM, a PROM, an EPROM, an EEPROM, a mask ROM, a flash ROM, a NAND flash memory, a NOR flash memory, and the like).

According to an embodiment of the present disclosure, the internal memory 932 may be an SSD. The external memory 934 may further include a flash drive, for example, a CF, an SD, a Micro-SD, a Mini-SD, an xD, or a memory stick. The external memory 934 may be functionally connected to the first electronic device 901 through various interfaces. According to an embodiment of the present disclosure, the first electronic device 901 may further include a storage device (or a storage medium) such as a hard disc drive.

The sensor module 940 may measure a physical quantity or detect an operating state of the first electronic device 901 to convert the measured or detected information into an electric signal. The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a color sensor 940H (e.g., red, green, and blue (RGB) sensor), a biometric sensor 940I, a temperature/humidity sensor 940J, an illumination sensor 940K, and a UV sensor 940M. Additionally or alternatively, the sensor module 940 may include, for example, an E-nose sensor (not illustrated), an EMG sensor (not illustrated), an EEG sensor (not illustrated), an ECG sensor (not illustrated), an IR sensor, an iris sensor (not illustrated), a fingerprint sensor (not illustrated), and the like. The sensor module 940 may further include a control circuit for controlling at least one sensor involved therein.

The input device 950 may include a touch panel 952, a (digital) pen sensor 954, a key 956, or an ultrasonic input device 958. The touch panel 952 may recognize a touch input through at least one of, for example, a capacitive type, a resistive type, an infrared type, and an acoustic wave type. The touch panel 952 may further include a control circuit. In the case of the capacitive type, physical contact or proximity recognition is possible. The touch panel 952 may further include a tactile layer. In this case, the touch panel 952 may provide a tactile reaction to a user.

The (digital) pen sensor 954 may be implemented, for example, using the same or similar method to receiving a user's touch input or using a separate recognition sheet. The key 956 may include, for example, a physical button, an optical key, or a keypad. The ultrasonic input device 958 may detect an acoustic wave with a microphone (e.g., a microphone 988) of the first electronic device 901 through an input tool for generating an ultrasonic signal to identify data and may perform wireless recognition. According to an embodiment of the present disclosure, the first electronic device 901 may receive a user input from an external device (e.g., a computer or server) connected thereto using the communication module 920.

The display 960 may include a panel 962, a hologram device 964 or a projector 966. The panel 962 may be, for example, a Liquid Crystal Display (LCD) or an Active Matrix Organic Light Emitting Diode (AM-OLED). The panel 962 may be implemented to be, for example, flexible, transparent, or wearable. The panel 962 may be integrated with the touch panel 952. The hologram device 964 may show a stereoscopic image in the air using interference of light. The projector 966 may project light onto a screen to display an image. The screen may be placed, for example, in the interior or on the exterior of the first electronic device 901. According to an embodiment of the present disclosure, the display 960 may further include a control circuit for controlling the panel 962, the hologram device 964, or the projector 966.

The interface 970 may include, for example, an HDMI 972, a USB 974, an optical interface 976, or a D-subminiature (D-sub) 978. The interface 970 may be included in, for example, the communication interface 160 illustrated in FIG. 1. Additionally or alternatively, the interface 970 may include, for example, a Mobile High-definition Link (MHL) interface, an SD card/Multi-Media Card (MMC) interface, or an Infrared Data Association (IrDA) standard interface.

The audio module 980 may bilaterally convert a sound and an electrical signal. The audio module 980 may process sound information input or output through, for example, the speaker 982, the receiver 984, the earphones 986, or the microphone 988.

The camera module 991 may capture a still image or moving image. According to an embodiment of the present disclosure, the camera module 991 may include one or more image sensors (e.g., a front sensor or a rear sensor), a lens (not illustrated), an Image Signal Processor (ISP) (not illustrated), or a flash (not illustrated) (e.g., an LED or a xenon lamp).

The power management module 995 may manage the power of the first electronic device 901. Although not illustrated, the power management module 995 may include, for example, a Power Management IC (PMIC), a charger IC, a battery, or a battery gauge. The PMIC may be mounted in, for example, an IC or a SoC semiconductor.

Charging methods may be divided into a wired type and a wireless type. The charger IC may charge a battery and prevent over voltage or over current from being introduced from a charger. According to an embodiment of the present disclosure, the charger IC may include a charger IC for at least one of the wired charging method and the wireless charging method. Examples of the wireless charging method may include a magnetic resonance scheme, a magnetic induction scheme, or an electromagnetic scheme, and an additional circuit for wireless charging, such as a coil loop, a resonance circuit, or a rectifier circuit, may be added.

The battery gauge may measure, for example, a residual quantity of the battery 996, or a voltage, a current, or a temperature while the battery 996 is being charged. The battery 996 may store or generate electricity and supply power to the first electronic device 901 using the stored or generated electricity. The battery 996 may include, for example, a rechargeable battery or a solar battery.

The indicator 997 may display a particular status of the first electronic device 901 or a part (e.g., the AP 910) thereof, for example, a booting status, a message status, a charging status, or the like. The motor 998 may convert an electric signal into mechanical vibrations. Although not illustrated, the first electronic device 901 may include a processing device (e.g., a GPU) for mobile TV support. The processing device for mobile TV support may process media data according to standards such as a digital multimedia broadcasting (DMB), a digital video broadcasting (DVB), or a media flow.

The above described constituent elements of the first electronic device according to various embodiments of the present disclosure may be formed of one or more components, and the name of a corresponding constituent element may be changed depending on the type of electronic device. The electronic device according to the present disclosure may include one or more of the aforementioned components or may further include other additional components, or some of the aforementioned components may be omitted. Further, some of the components of the electronic device according to various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with the term unit, logic, logical block, component, circuit, or the like. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific IC (ASIC) chip, a Field-Programmable Gate Arrays (FPGAs), and a programmable-logic device for performing operations which have been known or are to be developed hereafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130. At least a part of the programming module may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc ROM (CD-ROM) and a DVD, magneto-optical media such as a floptical disk, and hardware devices specifically configured to store and execute program commands, such as a ROM, a RAM, and a flash memory. In addition, the program instructions may include high class language codes, which may be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, in a recording medium having instructions stored therein, the instructions are set to allow at least one processor to perform at least one operation when executed by the at least one processor. The at least one operation may include: an operation of transmitting, by a first electronic device, stream data to a second electronic device; an operation of receiving, from the second electronic device, stream information associated with the stream data received by the second electronic device; and an operation of determining at least some of the stream data to transmit based on the received stream information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a first electronic device transmitting packets constituting stream data, to a second electronic device for providing a streaming service, the method comprising:
receiving, from the second electronic device, stream information comprising a system time of the second electronic device, a first timestamp of a packet received from the first electronic device at the system time, and a second timestamp of a packet being played in the second electronic device at the system time;
determining, by comparing the first timestamp with the system time, whether a first delay occurs;

determining, by comparing the first timestamp with the second timestamp, whether a second delay occurs; and controlling, based on determining that at least one of the first delay or the second delay occurs, at least one packet of the stream data to be transmitted to the second electronic device.

2. The method of claim 1, wherein the controlling of the at least one packet to be transmitted to the second electronic device comprises:

upon determining that the first delay occurs, modifying the at least one of the stream data to be transmitted to the second electronic device; and transmitting the modified at least one packet.

3. The method of claim 1, wherein the packets constituting the stream data are transmitted through a transmission control protocol (TCP) connection method.

4. The method of claim 1, wherein the controlling of the at least one packet to be transmitted to the second electronic device comprises:

upon determining that the first delay occurs, modifying at least one packet of the stream data so as to have a data size smaller than a reference value.

5. The method of claim 1, wherein the controlling of the at least one packet to be transmitted to the second electronic device comprises:

upon determining that the second delay occurs, modifying at least one frame having a data size smaller than a reference value among frames of the stream data.

6. The method of claim 1, wherein the controlling of the at least one packet to be transmitted to the second electronic device comprises:

upon determining that the second delay occurs, determining at least one frame of the stream data not to be transmitted to the second electronic device; and transmitting the stream data to the second electronic device except for the determined at least one frame.

7. A method of a second electronic device playing stream data constituted of packets for streaming service, the method comprising:

receiving packets of the stream data from a first electronic device;

transmitting, to the first electronic device, stream information comprising system time of the second electronic device, a first timestamp of a packet received from the first electronic device at the system time, and a second timestamp of a packet being played in the second electronic device at the system time; and receiving, from the first electronic device, at least one packets of the stream data controlled by the first electronic device based on determining that at least one of a first delay or a second delay occurs by comparing the system time, the first timestamp, and the second timestamp.

8. The method of claim 7, wherein the stream information is transmitted at a particular time or at designated time.

9. A first electronic device for transmitting packets constituting stream data for providing a streaming service comprising:

a memory storing instructions;

a communication module; and a processor configured to execute the stored instructions to:

receive, from a second electronic device, stream information comprising system time of the second electronic device, a first timestamp of a packet received from the first electronic device at the system time, and a second timestamp of a packet being played in the second electronic device at the system time, determine, by comparing the first timestamp with the system time, whether a first delay occurs, determine, by comparing the first timestamp with the second timestamp, whether a second delay occurs, and control, based on determining that at least one of the first delay or the second delay occurs, at least one packets of the stream data to be transmitted to the second electronic device.

10. The first electronic device of claim 9, wherein the processor is further configured to executed stored instructions to:

upon determining that the first delay occurs, modify the at least some of the subsequent stream data, and transmit the modified stream data through the communication module.

11. The first electronic device of claim 9, wherein the processor is further configured to executed stored instructions to, upon determining that the first delay occurs, modify at least one packet of the stream data so as to have a data size smaller than a reference value.

12. The first electronic device of claim 9, wherein the processor is further configured to executed stored instructions to, upon determining that the second delay occurs, modify at least one packet having a data size smaller than a reference value among frames of the stream data.

13. A non-transitory computer readable recording medium having a program recorded thereon executed by at least one processor to perform a method, the method comprising:

receiving, from a second electronic device, stream information comprising system time of the second electronic device, a first timestamp of a packet received from the first electronic device at the system time, and a second timestamp of a packet being played in the second electronic device at the system time;

determining, by comparing the first timestamp with the system time, whether a first delay occurs;

determining, by comparing the first timestamp with the second timestamp, whether a second delay occurs; and controlling, based on determining that at least one of the first delay or the second delay occurs, at least one packets of stream data to be transmitted to the second electronic device.

14. The non-transitory computer readable recording medium of claim 13, wherein the controlling of the at least one packet of the stream data comprises reducing an amount of data lost by selecting and dropping a frame having a frame size smaller than a certain frame size.

15. The method of claim 1, wherein it is determined that the first delay occurs if the first timestamp is earlier than the system time, and wherein it is determined that second delay occurs if the second timestamp is earlier than the first timestamp.

16. The first electronic device of claim 9, wherein it is determined that the first delay occurs if the first timestamp is earlier than the system time, and wherein it is determined that second delay occurs if the second timestamp is earlier than the first timestamp.

17. The non-transitory computer readable recording medium of claim 13, wherein it is determined that the first delay occurs if the first timestamp is earlier than the system time, and wherein it is determined that second delay occurs if the second timestamp is earlier than the first timestamp.

* * * * *